United States Patent [19]

Joormann et al.

[11] 4,435,200

[45] Mar. 6, 1984

[54] METHOD OF PREPARING PRECISION PRESSED GLASS OBJECT

[75] Inventors: Hendrik J. M. Joormann; Hendrik Verweij; Jan Haisma, all of Eindhoven, Netherlands

[73] Assignee: U.S. Philips Corporation, New York, N.Y.

[21] Appl. No.: 396,533

[22] Filed: Jul. 8, 1982

Related U.S. Application Data

[60] Division of Ser. No. 161,196, Jun. 19, 1980, Pat. No. 4,348,484, which is a continuation-in-part of Ser. No. 119,324, Feb. 7, 1980, abandoned.

[30] Foreign Application Priority Data

May 18, 1979 [NL] Netherlands ............ 7903914

[51] Int. Cl.³ .............. C03B 19/00; C03B 23/00; C03B 29/00; C03C 3/16
[52] U.S. Cl. .......................... 65/64; 65/65; 65/102; 350/417
[58] Field of Search .......... 501/44, 45, 48, 903; 65/61, 64, 65, 102; 350/417

[56] References Cited

U.S. PATENT DOCUMENTS

| | | | |
|---|---|---|---|
| 3,281,253 | 10/1966 | Weidel | 501/48 |
| 3,281,254 | 10/1966 | Weidel | 501/44 |
| 3,485,646 | 12/1969 | Junge | 501/45 |
| 3,585,057 | 6/1971 | Jahn | 501/45 |
| 3,846,142 | 11/1974 | Buzhinsky et al. | 501/45 |
| 3,979,322 | 9/1976 | Alexeev et al. | 501/45 |
| 3,989,532 | 11/1976 | Ray et al. | 501/45 X |
| 4,026,714 | 5/1977 | Lewis | 501/48 X |
| 4,108,673 | 8/1978 | Toratani et al. | 501/48 X |
| 4,285,730 | 8/1981 | Sanford et al. | 501/44 |

OTHER PUBLICATIONS

Leidtorp, "Vitrification and Crystallization Capacity of ... Glasses", Izv. Akad. Nauk. SSSR, Neorg. Mater., 8(11), 1972, pp. 2053-2054.

Primary Examiner—Richard V. Fisher
Attorney, Agent, or Firm—Paul R. Miller

[57] ABSTRACT

Glass objects, lenses in particular, can be pressed with precision from a glass which contains 45–55 mol. % $P_2O_5$, 15–40 mol. % BaO, 5–15 mol. % $Li_2O$, 5–35 mol. % PbO, 0–2 mol. % $Al_2O_3$ and 0–6 mol. % F. A cube of glass is made from the above composition and preheated to a temperature of 20°–60° C. above the American softening point to obtain a polishing effect. The preheated cube is then inserted into preheated dies which are closed to form a precision pressed object of the glass.

6 Claims, 2 Drawing Figures

METHOD OF PREPARING PRECISION PRESSED GLASS OBJECT

This application is a divisional application of Ser. No. 161,196, filed June 19, 1980, now U.S. Pat. No. 4,348,484, which is a continuation-in-part of Ser. No. 119,324, filed Feb. 7, 1980, now abandoned, and priority for all common subject matter is hereby claimed. In addition, application Ser. No. 298,131, filed Aug. 31, 1981, is a continuation of parent application Ser. No. 119,324, filed Feb. 7, 1980, and priority for all common subject matter is hereby claimed.

The invention relates to precision pressed glass objects, to glass and to a method of preparing that glass.

The invention provides precision pressed objects made of glass, lenses in particular, both spherical and aspherical lenses. Precision pressed is here understood to mean that, after pressing, without further aftertreatment, the lens does not deviate at any single point of its surface by more than 0.5 micrometers from the desired curvature, the surface roughness being less than 0.02 micrometers.

Lenses are used in a great variety of products, including film cameras, and equipment for reading information with laser beams.

No glasses are known from which objects can be pressed with such precision.

The invention provides a glass from which objects can be pressed with the above-defined precision.

The precision pressed objects of glass and the glass according to the invention are characterized in that the glass contains 45–55 mol.% $P_2O_5$, 15–40 mol.% BaO, 5–35 mol.% PbO, 5–15 mol.% $Li_2O$, 0–2 mol.% $Al_2O_3$ and 0–6 mol.% F in the form of fluoride, wherein up to 25% of the BaO may be replaced by an equimolar quantity of one or more of the oxides CaO, MgO and SrO, and up to 25% of the $Li_2O$ may be replaced by an equimolar quantity of one or more other alkali metal oxides.

Glasses intended for the precision pressing of lenses must satisfy several requirements. In order to be pressable, the glass must be sufficiently soft. In the circumstances prevailing during pressing, the glass must not crystallize, that is to say it must be stable. For the practical application of the glass it is extremely important that the glass should be sufficiently resistant to atmospheric influences (corrosion resistant).

Furthermore, colourless glass is generally preferred for lenses.

A glass is known from U.S. Pat. 3,281,253 which is prepared from aluminum metaphosphate, an alkali metal metaphosphate, an alkaline earth metal metaphosphate and lead metaphosphate. This glass is used for lens systems. The known glass does not satisfy the above-defined requirements as regards composition. In addition, no indication is given how the lens systems are produced.

The invention is based on the recognition of the fact that the above-mentioned requirements imposed on glasses intended for precision pressing can only be optimally satisfied by the choice of one specific alkaline earth metal oxide, namely barium oxide, by the choice of a specific alkali metal oxide, namely lithium oxide, and by the choice of specific ranges for the composition of the glass.

Very satisfactory results as regards the above-mentioned properties have been obtained with the following glasses: 45–55 mol. % (preferably 46–52 mol. %) $P_2O_5$, 15–35 mol. % (preferably 18–22 mol. %) BaO, 8.5–11.5 mol % (preferably 9–11 mol. %) $Li_2O$, 9–22 mol. % (preferably 18–22 mol.%) PbO, 0–2 mol. % $Al_2O_3$ and 0–6 mol. % F in the form of fluoride.

The glass according to the invention are colourless, properly pressable (not too hard) and have a corrosion resistance better than class 1 (that is to say, after having been stored for 2 weeks at 50° C. in a relative humidity of 99% the glasses according to the invention were free from stains). In addition, the glasses according to the invention are stable, that is to say they do not tend to crystallize during their preparation or during their use for the pressing of lenses.

The $P_2O_5$ content of the glass according to the invention was chosen between 45 and 55 mol. %. When the $P_2O_5$ content is below 45 mol. % the glass becomes too hard to allow pressing and is not sufficiently stable. When the $P_2O_5$ content exceeds 55 mol. %, the corrosion resistance is insufficient.

The glass according to the invention contains 15–40 mol. % BaO as the alkaline earth metal oxide. Not more than 25% of the BaO may be replaced by one or more other alkaline earth metal oxides. Higher contents of CaO and SrO cause crystallization; higher contents of MgO affect the corrosion resistance negatively.

A BaO content below 15 mol. % results in an inadequate corrosion resistance. A BaO content of more than 40 mol. % diminishes the stability and reduces the pressability.

The glass according to the invention contains 5–15 mol. % $Li_2O$. When the $Li_2O$ content is less than 5 mol. %, the pressability and the stability are inadequate. When the quantity of $Li_2O$ exceeds 15 mol. %, the corrosion-resistance is too low. Up to 25% of the $Li_2O$ may be replaced by one or more other alkali metal oxides. Inherently, such a replacement results in a reduced corrosion-resistance.

As in the case of the known glasses, the glass according to the invention contains PbO. The limits for the PbO content have been determined on the base of tests: a PbO content below 5 mol. % results in an insufficient pressability and too low a stability. A content of more than 35 mol. % reduces both the corrosion-resistance and the stability.

The glass according to the invention may comprise the customary glass additives. More particularly, the glass may contain 0–2 mol. % $Al_2O_3$ (to improve the stability) and 0–6 mol. % F as fluoride (to improve the pressability).

The glasses according to the invention may be produced in accordance with any customary technique for preparing glass. The carbonates, nitrates, metaphosphates, etc. of the above-mentioned cations may be used as the starting material.

A method of producing the precision pressed object from glass according to the invention will now be explained with reference to the accompanying drawing. In this drawing.

Figure 1:
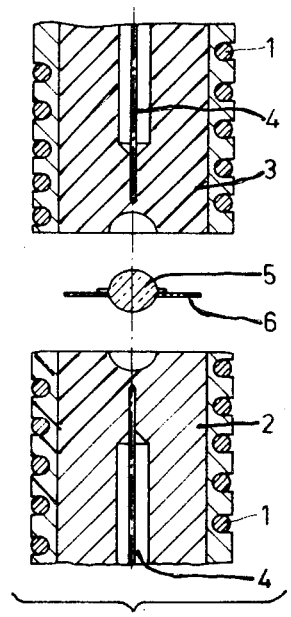
FIG. 1 shows a device for carrying out such a method.

The device shown in FIG. 1 for the precision pressing of an object of glass consists of a lower die (2) and an upper die (3). The dies have been provided with thermocouples (4) which are connected to a heating element (1) via a control unit, not shown. The precision pressed object is denoted by (5).

The object according to the invention can be produced with the device shown in FIG. 1 in the following manner.

Figure 2:
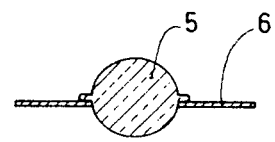
FIG. 2 shows a precision pressed object according to the invention.

A precision-ground cube produced from glass according to the invention is positioned on a carrier (6). The cube need not have been X polished. The cube is pre-heated in an oven to, for example, 20°-60° C. above the American softening point, a polishing effect of the cube surface then being obtained. In the meantime the dies of the device, shown in FIG. 1 have been pre-heated to a temperature of 10°-40° C. above the American softening point of the glass used. Thereafter the pre-heated glass cube and carrier 6 are together positioned between the dies 2 and 3. The dies are then closed. After opening of the dies an object is obtained as shown in FIG. 2. When this method starts from a cube produced from glass according to the invention, an object is obtained that has been pressed with the above-defined precision.

EXAMPLE

Seven glasses having the composition shown in Table A were prepared by fusing appropriate mixtures of starting materials. The compositions were calculated with respect to the quantities of starting materials used. All glasses satisfied the above-defined requirements: they are sufficiently corrosion resistant, have no tendency to crystallize and are sufficiently soft for pressing operations. The glasses are colourless.

By means of the device shown in FIG. 1, lenses were pressed for the glasses numbers 6 and 7. The dies were made of chromium-nickel steel. Pressing was carried-out at a temperature of 440° C.

TABLE A

| No. | 1 | 2 | 3 | 4 | 5 | 6 | 7 |
|---|---|---|---|---|---|---|---|
| $P_2O_5$ | 45 | 45 | 49 | 50 | 55 | 50 | 46,8 |
| BaO | 22 | 33 | 19,6 | 30 | 27 | 20 | 18,8 |
| $Li_2O$ | 11 | 11 | 9,8 | 10 | 9 | 10 | 9,3 |
| PbO | 22 | 11 | 19,6 | 10 | 9 | 20 | 18,8 |
| $Al_2O_3$ | — | — | 0,5 | — | — | — | 0,9 |
| F | — | — | 1,5 | — | — | — | 5,4 |
| American softening points °C. | 420 | 390 | 425 | 435 | 430 | 405 | 409 |

The American softening point is the temperature at which the viscosity is $10^{7.6}$ poise.

What is claimed is:

1. A method of forming a precision pressed object of glass comprising the steps of
    precisely grinding a cube of glass having a composition consisting essentially of 45–55 mol.% $P_2O_5$, 15–40 mol.% BaO, 5–35 mol.% PbO, 5–15 mol.% $Li_2O$, 0–2 mol.% $Al_2O_3$, and 0–6 mol.% F in the form of fluoride wherein up to 25% of BaO may be replaced by an equimolar quantity of at least one of CaO, MgO and SrO, and up to 25% of $Li_2O$ may be replaced by an equimolar quantity of at least one other alkali metal oxide;
    positioning said cube on a carrier;
    preheating said cube to a temperature 20°–60° C. above the American softening point to obtain a polishing effect;
    preheating dies of a glass forming device to a temperature 10°–40° C. above the American softening point of said glass;
    inserting said preheated cube and carrier into said dies; and
    closing said dies to form a precision pressed object of said glass.

2. A method according to claim 1, wherein said glass has a composition of 45–55 mol.% $P_2O_5$, 15–35 mol.% BaO, 9–22 mol.% PbO, 8.5–11.5 mol.% $Li_2O$, 0–2 mol.% $Al_2O_3$, and 0–6 mol.% F.

3. A method according to claim 1, wherein said glass has a composition of 46–52 mol.% $P_2O_5$, 18–22 mol.% BaO, 18–22 mol.% PbO, 9–11 mol.% $Li_2O$, 0–2 mol.% $Al_2O_3$, and 0–6 mol.% F.

4. A method according to claim 1, wherein said precision pressed object of said glass is an optical lens.

5. A method according to claim 1, wherein said American softening point is the temperature at which the viscosity of said glass is $10^{7.6}$ poise.

6. A method according to claim 1, wherein said precision pressing is carried out at a temperature of 440° C.

* * * * *